United States Patent
Binder et al.

(10) Patent No.: US 11,043,877 B2
(45) Date of Patent: Jun. 22, 2021

(54) SLIP RING UNIT WITH COOLING FAN INSULATING SEGMENT

(71) Applicant: SIEMENS AKTIENGESELLSCHAFT, Munich (DE)

(72) Inventors: Herbert Binder, Neuburg (DE); Oliver Memminger, Neuburg a. Inn (DE); Andrej Raskopf, Passau (DE); Klaus Schifferer, Neuhaus am Inn (DE)

(73) Assignee: FIENDER GMBH, Bocholt (DE)

( * ) Notice: Subject to any disclaimer, the term of this patent is extended or adjusted under 35 U.S.C. 154(b) by 20 days.

(21) Appl. No.: 16/349,860

(22) PCT Filed: Oct. 18, 2017

(86) PCT No.: PCT/EP2017/076537
§ 371 (c)(1),
(2) Date: May 14, 2019

(87) PCT Pub. No.: WO2018/091215
PCT Pub. Date: May 24, 2018

(65) Prior Publication Data
US 2020/0076274 A1 Mar. 5, 2020

(30) Foreign Application Priority Data
Nov. 15, 2016 (EP) .................................... 16198783

(51) Int. Cl.
*H02K 9/28* (2006.01)
*F03D 80/60* (2016.01)
(Continued)

(52) U.S. Cl.
CPC ............... *H02K 9/28* (2013.01); *F03D 80/60* (2016.05); *H01R 39/08* (2013.01); *H01R 39/26* (2013.01); *H02K 7/183* (2013.01); *H02K 13/003* (2013.01)

(58) Field of Classification Search
CPC ........ H02K 9/28; H02K 7/183; H02K 13/003; F03D 80/60; H01R 39/08; H01R 39/26
(Continued)

(56) References Cited

U.S. PATENT DOCUMENTS

| | | | | |
|---|---|---|---|---|
| 837,033 A | * | 11/1906 | Bunet ...................... | H02K 9/28 310/227 |
| 853,283 A | * | 5/1907 | Waters ..................... | H02K 9/28 310/227 |

(Continued)

FOREIGN PATENT DOCUMENTS

| | | | |
|---|---|---|---|
| DE | 504 351 C | 8/1930 | |
| DE | 504351 | * 8/1930 | ............... H02K 9/28 |

(Continued)

OTHER PUBLICATIONS

PCT International Search Report and Written Opinion of International Searching Authority dated Feb. 1, 2018 corresponding to PCT International Application No. PCT/EP2017/076537 filed Oct. 18, 2017.

*Primary Examiner* — Ahmed Elnakib
(74) *Attorney, Agent, or Firm* — Henry M. Feiereisen LLC

(57) ABSTRACT

A slip ring unit for an electrical machine is provided for accommodating a carbon brush system. The slip ring unit includes at least one insulating segment having shaped sections for cooling parts of the electrical machine. The insulating segment having the shaped sections is shaped from the insulating segment as a fanwheel, wherein the insulating segment having the shaped sections forms a fan to (Continued)

distribute a cooling air flow to the parts of the electrical machine to be cooled. The slip ring unit has boreholes on the sides of supports of the slip rings for passage of cooling air.

12 Claims, 2 Drawing Sheets

(51) Int. Cl.
*H01R 39/08* (2006.01)
*H01R 39/26* (2006.01)
*H02K 7/18* (2006.01)
*H02K 13/00* (2006.01)

(58) Field of Classification Search
USPC ............... 310/227, 219, 143, 147, 127–129, 310/231–247
See application file for complete search history.

(56) References Cited

U.S. PATENT DOCUMENTS

| | | | | |
|---|---|---|---|---|
| 1,277,783 | A | * 9/1918 | Uggla | H02K 9/28 310/227 |
| 3,784,855 | A | * 1/1974 | Motegi | H02K 9/28 310/227 |
| 4,410,821 | A | 10/1983 | Kurt | |
| 2012/0200194 | A1 | 8/2012 | Schwery et al. | |
| 2020/0076274 | A1 * | 3/2020 | Binder | F03D 80/60 |

FOREIGN PATENT DOCUMENTS

| | | | |
|---|---|---|---|
| DE | 964971 | * 5/1957 | H02K 9/28 |
| DE | 1 231 798 B | 1/1967 | |
| DE | 10 2009 048 265 A1 | 4/2011 | |
| EP | 0052385 A1 | 5/1982 | |
| EP | 2887510 A1 | 6/2015 | |
| EP | 2 961 009 A1 | 12/2015 | |
| EP | 2961009 | * 12/2015 | H02K 9/28 |
| GB | 12889 A | 2/1911 | |
| GB | 181012889 A | 2/1911 | |

* cited by examiner

SLIP RING UNIT WITH COOLING FAN INSULATING SEGMENT

CROSS-REFERENCES TO RELATED APPLICATIONS

This application is the U.S. National Stage of International Application No. PCT/EP2017/076537, filed Oct. 18, 2017, which designated the United States and has been published as International Publication No. WO 2018/091215 and which claims the priority of European Patent Application, Serial No, 16198783.9, filed Nov. 15, 2016, pursuant to 35 U.S.C. 119(a)-(d).

BACKGROUND OF THE INVENTION

The invention relates to a slip ring unit for an electrical machine, wherein the slip ring unit is provided for accommodating a carbon brush system and wherein the slip ring unit has at least one insulating segment.

The invention furthermore relates to an electrical machine with a slip ring unit of this kind.

A slip ring unit of this kind for an electrical machine is used in wind turbines, for example. Here, it is necessary for the electrical machines in the form of the generators and their components to become more and more compact. This leads to the slip ring components being under an increasingly heavy load while remaining the same size, since the temperatures, in particular of slip rings, slip ring brushes and carbon brush retainers, often increase sharply. It is therefore necessary to cool all the components of the electrical machine, in particular also the slip ring unit, as efficiently as possible.

EP 2 961 009 A1 relates to a slip ring arrangement, in particular for a wind-power generator, having at least one rotation body, which is able to be mounted such that it can rotate about an axis of rotation, and at least two slip rings, which are arranged on a peripheral surface of the at least one rotation body in each case. In order to improve the cooling of slip ring arrangements, it is proposed that the rotation body has protrusions (5) jutting out from the peripheral surface for generating a cooling air flow.

DE 10 2009 048 265 A1 relates to a slip ring arrangement for a rotating electrical machine, which slip ring arrangement comprises a plurality of slip rings arranged concentrically with regard to the machine axis and in succession in the axial direction. A simplified structure which saves weight and is suitable for a particularly effective cooling is achieved in that the slip ring arrangement is configured to be self-supporting.

The object underlying the invention is to specify a slip ring unit of the type cited in the introduction, which enables a uniform temperature distribution of the slip ring unit in a simple and cost-effective manner and thus enables as effective a cooling of the electrical machine as possible.

SUMMARY OF THE INVENTION

This object is achieved in a slip ring unit of the type cited in the introduction in that at least one insulating segment has shaped sections for cooling parts of the electrical machine, wherein the insulating segment having the shaped sections is shaped from the insulating segment as a fanwheel, wherein the insulating segment having the shaped sections forms a fan, which is provided to distribute a cooling air flow to the parts of the electrical machine to be cooled, and wherein the slip ring unit has boreholes on the sides of the supports of the slip rings for feeding through cooling air.

The invention is based on the recognition that the slip ring surface cannot be enlarged at higher powers due to cost reasons, which leads to the slip ring body being heated more strongly. Because of this, without further measures, the temperature of the individual components of a slip ring unit would increase to a critical value, and damage to the slip ring and to the slip ring brush could occur.

The invention solves this temperature problem in a surprisingly simple manner in that at least one insulating segment of the slip ring unit has shaped sections for cooling parts of the electrical machine. Thus, between the individual slip rings of the electrical machine, at least one insulating segment which is present in any case is formed such that it acts as a fan. As a result, the temperatures of the slip ring unit and of the electrical machine as a whole can be considerably reduced. This leads to smaller sizes of the slip ring unit becoming possible and therefore also higher power levels with the same size. The shaped sections of the insulating segment or optionally a plurality of insulating segments ideally form a fan in this case, which is provided to distribute a cooling air flow to the parts of the electrical machine to be cooled. It is even possible for the retrofitting of already existing electrical machines also to be enabled with the aid of slip ring units formed in such a manner, which then ideally even have a higher service life or a higher load-bearing capacity compared to normal slip ring units.

A targeted cooling of the slip ring unit and a carbon brush unit arranged in the slip ring unit is achieved in a simple manner in that the insulating segment having the shaped sections forms a fan, which is provided for distributing a cooling air flow to the parts of the electrical machine to be cooled.

In terms of construction, this succeeds with low expenditure in that the insulating segment having the shaped sections is shaped from the insulating segment as a fanwheel.

A targeted cooling air distribution also towards components of a carbon brush unit is ensured by the slip ring unit having boreholes for feeding through cooling air. As the shaped sections of the insulating segment and the boreholes on the side of the supports of the slip rings interact, this results in a synergistic distribution of the cooling air of the electrical machine. To this end, the boreholes are arranged on the side of the supports of the slip rings and the shaped sections of the insulating segment such that the fanwheel formed from the shaped sections of the insulating segment interacts with the boreholes of the slip rings.

Advantageous embodiments are contained in the sub-claims.

The boreholes are advantageously provided for conducting cooling air through to a carbon brush unit interacting with the slip ring unit in a targeted manner.

A further effect consists in that the boreholes are provided for the enlargement of the cooling surface of the slip ring unit.

A reliable constructive embodiment, which contains a good mix of expenditure and use, is formed by the slip ring unit being configured as a slip ring unit with twin-flow cooling, in which at least the outer-lying insulating segments are shaped as fans.

BRIEF DESCRIPTION OF THE DRAWING

The invention is described and explained in more detail below on the basis of the exemplary embodiments shown in the Figures, in which.

DETAILED DESCRIPTION OF PREFERRED EMBODIMENTS

Figure 1:
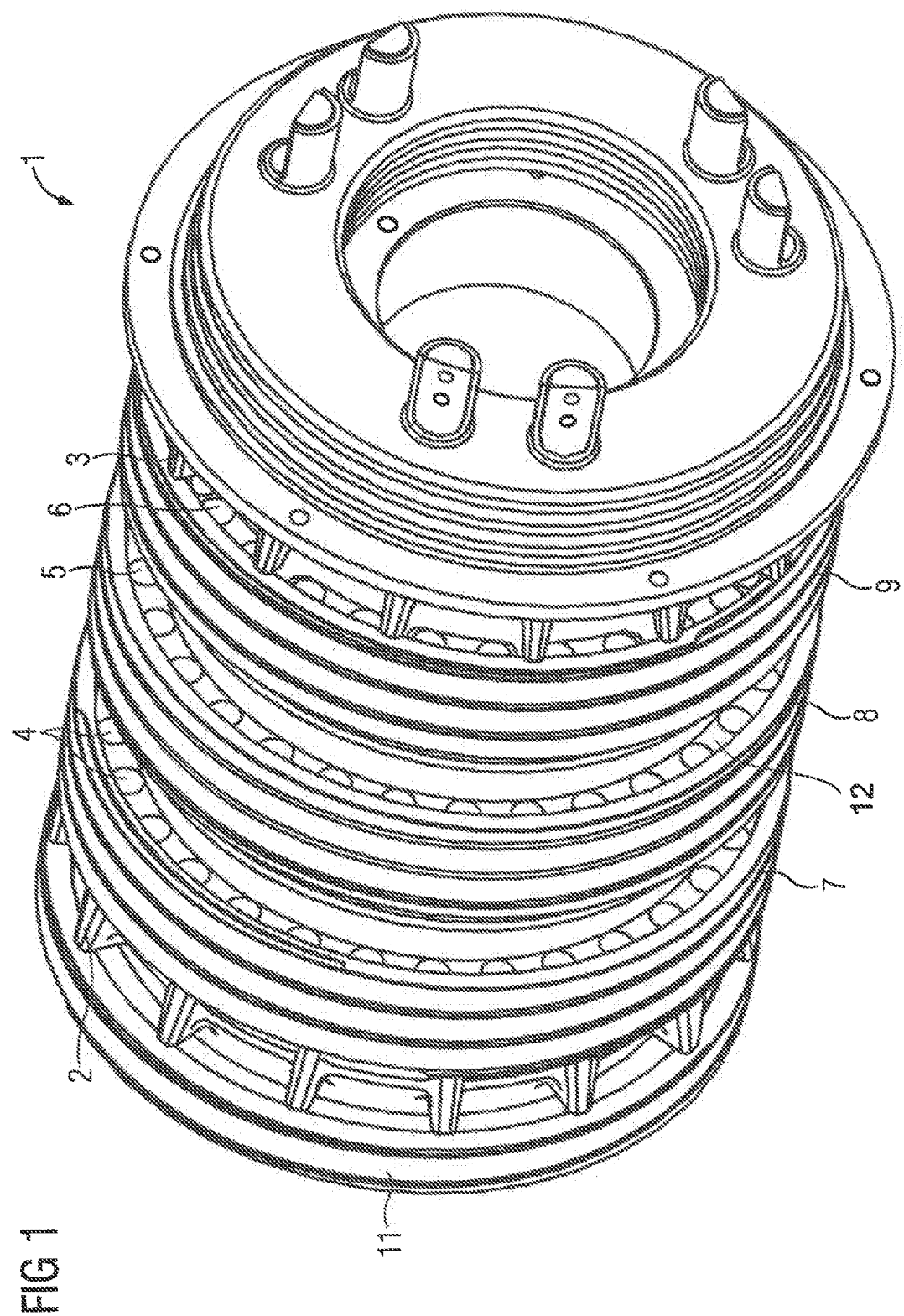
FIG. 1 shows an exemplary embodiment of a slip ring unit with twin-flow cooling comprising fan insulating segments lying on the outside in each case and FIG. 2 shows a side view of the slip ring unit shown in FIG. 1.

FIG. 1 shows an exemplary embodiment of a slip ring unit 1 with twin flow cooling comprising fan insulating segments 2,3 lying on the outside in each case. The slip ring body 1 depicted in FIG. 1 substantially consists of the slip rings 7,8,9, i.e. of a three-phase slip ring system as well as a grounding ring 11. Arranged between the slip rings 7,8,9 are insulating segments 2,3. The insulating segments 2,3,10 of the slip ring body 1 lying on the outside in each case have shaped sections for cooling parts of the electrical machine. The insulating segments 2,3 thus each form a type of fan unit, which are provided for the distribution of a cooling air flow to the parts of the electrical machine to be cooled. Fresh air from the surrounding environment can be directed to individual components of the electrical machine in a targeted manner as a result. To this end, the slip ring unit has slip ring boreholes 4,5,6 on the sides of supports 12 of the slip rings 7,8,9. Said slip ring boreholes 4,5,6 serve the feeding through of cooling air for example to a carbon brush unit interacting with the slip ring unit. This is not depicted in greater detail in FIG. 1 for reasons of clarity.

The slip ring body depicted in FIG. 1, which is formed from the slip ring unit 1, thus forms a slip ring unit 1 with twin-flow cooling, which is able to cool the directly utilized components such as slip ring brushes, brush retainers and the slip ring body itself by exploiting the ambient air of the cooling circuit of the slip ring unit 1 which is present in any case. The temperatures of the electrical machine are considerably reduced as a result. The consequentially lower temperature enables smaller sizes of the slip ring bodies or the slip ring unit 1. As a result, the slip ring unit 1 can be loaded with more brushes per phase, which would not be possible without cooling of this kind. It is thus possible to realize higher power levels than before. In addition, in this kind of cooling, an external ventilation is no longer required for the generation of volumetric flow rate, because the volumetric flow rate is generated at the same time by the fan of the slip ring unit 1 which is present in any case and by the slip ring body according to the invention, which is formed as a twin-flow cooling system by the two fans integrated in the slip ring with the correspondingly shaped insulating segments 2,3.

Additional costs do not arise in an embodiment of the slip ring unit 1 of this kind, as the insulating segments 2,3 are already provided in any case due to the system. A slip ring unit 1 of this kind can also take place when retrofitting electrical machines, for example in particular also in wind turbines, as the slip ring unit 1 may be formed such that it is correspondingly compatible with existing electrical machines and generators. This leads to an avoidance of additional costs for spare parts storage, purchasing, etc. as well.

The particular feature of the slip ring unit 1 depicted in FIG. 1 consists in particular in that the cooled ambient air can be fed to the required points, i.e. directly to and through the slip ring, in a precise manner. This takes place on the one hand by a direct feeding of air to the contact surface at which the heat arises. By a corresponding formation of the insulating segments 2,3 of the slip ring body 1, a slip ring body with twin flow ventilation thus emerges which has a considerably increased cooling surface, wherein precisely this surface is supplied with cooling air. The cooling air is removed from the cooling air flow which is present in any case using the corresponding insulating segments 2,3, which are shaped as fans, by way of the rotating slip ring body 1 and is supplied to the regions at risk directly. In this case, the feeding of air can be supported further still by a particular air guidance system. The cooling system can be further supported here by a radial fan which is generally present in the slip ring unit 1 as standard, which is not shown in greater detail in FIG. 1. Thus, the heated cooling air is drawn in from the slip ring fan and discharged from the slip ring space into the surrounding environment by way of the air flow through the fan housing. This means that the contact surfaces of the slip ring unit are thus cooled directly as a result.

The slip ring contact surfaces and the brush temperatures thus remain in a temperature range suitable for operation due to these measures and the operation is protected from overheating. Therefore, it is possible for significantly smaller, lower-cost components to be used on the whole, and a problem-free operation of the electrical machine is thus ensured. In addition to an application in generators, for example for wind turbines, the invention may also find use in motors.

Figure 2:
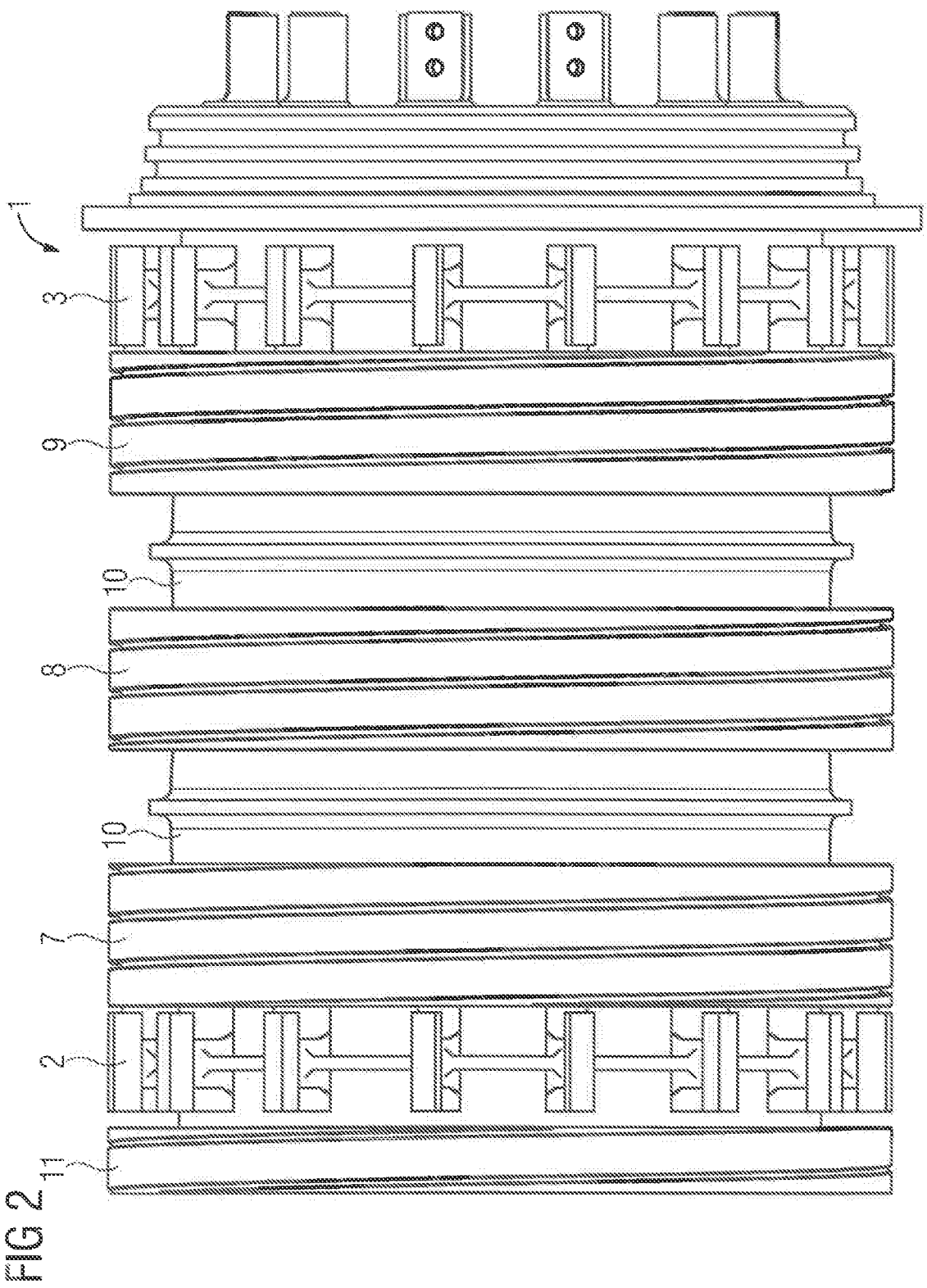

FIG. 2 shows a side view of the slip ring unit 1 shown in FIG. 1. To avoid repetitions, reference is made to the embodiments relating to FIG. 1 with regard to the function and the reference characters.

In summary, the invention thus relates to a slip ring unit 1 for an electrical machine, wherein the slip ring unit 1 is provided for accommodating a carbon brush system and wherein the slip ring unit 1 has at least one insulating segment 2,3,10. For an effective cooling of the electrical machine, it is proposed that at least one insulating segment 2,3 has shaped sections for cooling parts of the electrical machine, wherein the insulating segment 2,3 having the shaped sections is shaped from the insulating segment 2,3 as a fanwheel, wherein the insulating segment 2,3 having the shaped sections forms a fan, which is provided to distribute a cooling air flow to the parts of the electrical machine to be cooled, and wherein the slip ring unit 1 has boreholes 4,5,6 on the sides of the supports 12 of the slip rings 7,8,9 for feeding through cooling air.

What is claimed is:

1. A slip ring unit for an electrical machine, said slip ring unit comprising:
   slip rings disposed on supports having axial boreholes for guiding cooling air therethrough; and
   at least one electrically insulating segment arranged between adjacent ones of the slip rings, with at least axially outer-lying ones of the electrically insulating segments having sections shaped as a fanwheel operating as a fan distributing the cooling air as a twin air flow through the boreholes to parts of the electrical machine requiring cooling.

2. The slip ring unit of claim 1, wherein the boreholes are configured to conduct the cooling air flow to a carbon brush unit interacting with the slip ring unit.

3. The slip ring unit of claim 1, wherein the shaped sections of the insulating segments are configured such that the fanwheel interacts with the boreholes of the slip rings.

4. The slip ring unit of claim 1, wherein the boreholes are provided for enlarging a cooling surface of the slip ring unit.

5. An electrical machine, comprising:
a carbon brush system; and
a slip ring unit for accommodating the carbon brush system, said slip ring unit comprising slip rings disposed on supports having axial boreholes for guiding cooling air therethrough; and at least one electrically insulating segment arranged between adjacent ones of the slip rings, with at least axially outer-lying ones of the electrically insulating segments having sections shaped as a fanwheel operating as a fan distributing the cooling air as a twin air flow through the boreholes to parts of the electrical machine requiring cooling.

6. The electrical machine of claim 5, wherein the carbon brush system includes a carbon brush unit interacting with the slip ring unit, said boreholes of the slip rings being configured to conduct the cooling air flow to the carbon brush unit of the carbon brush system.

7. The electrical machine of claim 5, wherein the shaped sections of the insulating segments are configured such that the fanwheel interacts with the boreholes of the slip rings.

8. The electrical machine of claim 5, wherein the boreholes are provided for enlarging a cooling surface of the slip ring unit.

9. A wind turbine, comprising an electrical machine, said electrical machine slip rings disposed on supports having axial boreholes for guiding cooling air therethrough; and at least one electrically insulating segment arranged between adjacent ones of the slip rings, with at least axially outer-lying ones of the electrically insulating segments having sections shaped as a fanwheel operating as a fan distributing the cooling air as a twin air flow through the boreholes to parts of the electrical machine requiring cooling.

10. The wind turbine of claim 9, wherein the carbon brush system includes a carbon brush unit interacting with the slip ring unit, said boreholes of the slip rings being configured to conduct the cooling air flow to the carbon brush unit of the carbon brush system.

11. The wind turbine of claim 9, wherein the shaped sections of the insulating segments are configured such that the fanwheel interacts with the boreholes of the slip rings.

12. The wind turbine of claim 9, wherein the boreholes are provided for enlarging a cooling surface of the slip ring unit.

* * * * *